Sept. 1, 1964 H. MULCH 3,146,667
SLIDE PROJECTOR WITH SLIDE PRESELECTION MEANS
Filed May 23, 1962 4 Sheets-Sheet 1

INVENTOR
HANS MULCH
BY
Toulmin & Toulmin
Attorneys

Sept. 1, 1964            H. MULCH            3,146,667

SLIDE PROJECTOR WITH SLIDE PRESELECTION MEANS

Filed May 23, 1962            4 Sheets-Sheet 3

INVENTOR
HANS MULCH
BY Toulmin & Toulmin
Attorneys

United States Patent Office 3,146,667
Patented Sept. 1, 1964

3,146,667
SLIDE PROJECTOR WITH SLIDE
PRESELECTION MEANS
Hans Mulch, Wetzlar (Lahn), Germany, assignor to Ernst
Leitz Gesellschaft mit beschränkter Haftung, Wetzlar
(Lahn), Germany
Filed May 23, 1962, Ser. No. 196,952
Claims priority, application Germany June 2, 1961
27 Claims. (Cl. 88—28)

The present invention relates to a slide projector having an automatic slide changing mechanism and an arrangement for transporting a slide magazine in either the forward or reverse direction, more particularly, to such a slide projector having a device thereon for indicating at all times the position of the slide magazine in the projector and for preselecting the sequence in which the slides in the slide magazine can be projected.

Slide projectors have been constructed wherein the slide changing operation and the transportation of the slide magazine in either the forward or reverse direction are performed automatically upon the actuation of an operating lever. Such projectors may be provided with adjusting structure whereby the slide magazine can be selectively moved either in the forward or reverse directions, whereby slides which have already been projected can be projected again.

Slide projectors have also been proposed wherein the operating lever is combined with an indicating arrangement whereby the position of the slide magazine in the projector can be quickly ascertained.

Slide projectors have also been proposed which are particularly adapted for advertising purposes in that a return mechanism is provided to return the slide magazine to its initial position after projection of the slides therein in a predetermined sequence. Structure may be provided wherein the slide magazine is moved by several slide changing operations but wherein no slides are projected. The return movement of the slide magazine, however, is always the same but can be adjusted to occur after a predetermined number of slides has been projected.

Although the structures of such slide projectors have been developed to an advanced state, it is still not possible with these slide projectors to preselect the slides which are to be projected before each slide changing operation. The prior art projectors required that the slides be projected in a particular sequence without any selection being possible of the slides to be projected once this sequence has commenced. Thus, with these slide projectors one could not selectively advance or return the slide magazine various distances in order to bring certain slides into position so as to be projected by the projector.

It is therefore the principal object of the present invention to provide a novel and improved automatic slide projector.

It is a further object of the present invention to provide a slide projector wherein the operator can individually select each slide which is to be projected after the slides have been positioned in the slide magazine.

It is another object of the present invention to provide a slide projector wherein the slide magazine can be readily moved in either direction to a position to project any slide which has been selected by the operator.

The slide projector of the present invention essentially comprises a slide indicating device which is driven by the mechanism for moving the slide magazine in the guideway of the projector. The slide indicating structure includes a preselector switch which is adjustable so as to register with one of a plurality of numbers on a numbered disk which numbers correspond to the slide compartments of the slide magazine. A manually operable operator rod acts in conjunction with the preselector switch in order to drivingly engage an electric motor with the mechanism for moving the slide magazine wherein the motor operates to move the magazine into the position corresponding to the number to which the preselector switch has been positioned. The slide indicating device is so connected to the magazine moving mechanism that the position of the slide magazine is indicated on the numbered dial at all times.

Each switching step of the slide magazine or movement of the slide magazine a distance of one slide compartment is transmitted through an electrical control circuit to correspondingly actuate the slide indicating device. The slide indicating device which is actuated by electromagnets thus moves in conjunction with the forward or advance movement of the slide magazine.

A stationary index mark is provided to cooperate with the numerals on the numbered disk so that the numeral opposite the index corresponds to the number of the slide compartment in the slide projecting position.

In order to move the slide magazine in accordance with the positioning of the preselector switch, a reversible electric motor is provided which is selectively rotatable in the direction as determined by the positioning of a reversing switch which indicates the direction of movement of the slide magazine. An electromagnetically operated clutch arrangement is provided to drivingly engage the electric motor with the slide magazine moving mechanism.

The engagement or disengagement of the electric motor with the slide magazine moving means occurs as a function of the operating lever which simultaneously operates the slide changing mechanism and the magazine moving mechanism of the projector. The operating lever has two operating positions wherein in one position only the slide changing mechanism and the magazine moving mechanism are connected in circuit, and in the second position the electric motor is engaged with the slide moving mechanism in addition to the slide changing mechanism and slide moving mechanism being connected in circuit.

A safety switch is provided in the control circuit to ensure that the slide magazine is moved only when the slide changing mechanism is not in the projecting position.

The hand operating lever, the slide indicating device and the reversing switch can be enclosed in a single casing which can be connected with the slide projector through a remote control cable. The impulse sending structure and the additional electric motor can also be placed in a common assembly or casing which can be selectively attached to the slide projector. In this latter casing a detachable coupling is provided between the impulse producing structure and the mechanism for moving the slide magazine.

Additional objects and advantages of this invention will be apparent upon reference to the accompanying description when taken in conjunction with the following drawings, wherein FIGURE 1 is a schematic view of a slide projector according to the present invention and showing the electric motor casing and the slide indicating device casing being connected to the projector by cables;

A specific embodiment of the present invention will next be described in detail with reference to the accompanying drawings wherein like reference symbols indicate the same parts throughout the various views.

Figure 1:
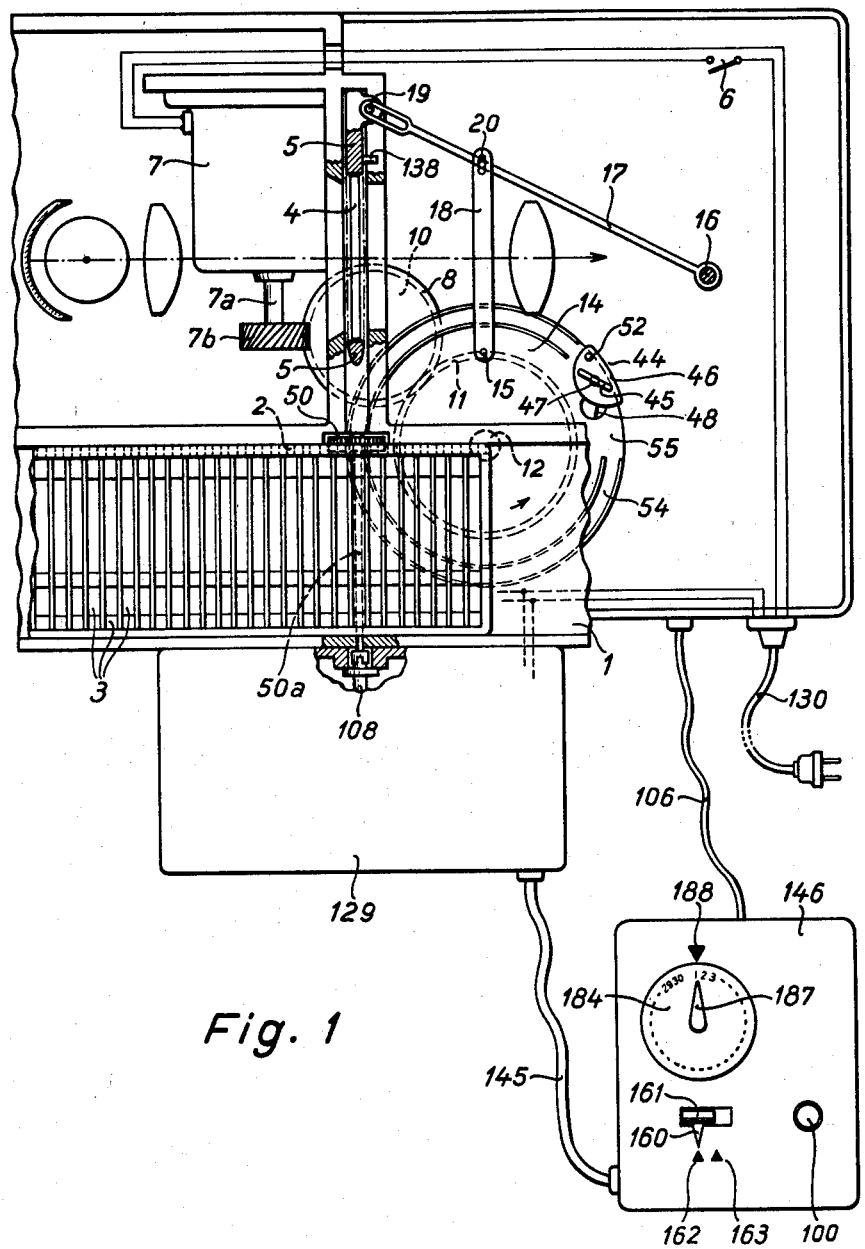

Proceeding next to FIGURE 1, the slide projector is provided with a guideway 1 upon which is moved a slide magazine 3 having a rack gear 2 on the lower surface thereof. The slide magazine is provided with a number of conventional slide compartments which contain slides 4 which are moved by a slider or slide-gripping member 5 which constitutes a component of the slide changing mechanism illustrated in FIGURE 1 and subsequently to be described in detail.

Figure 2:
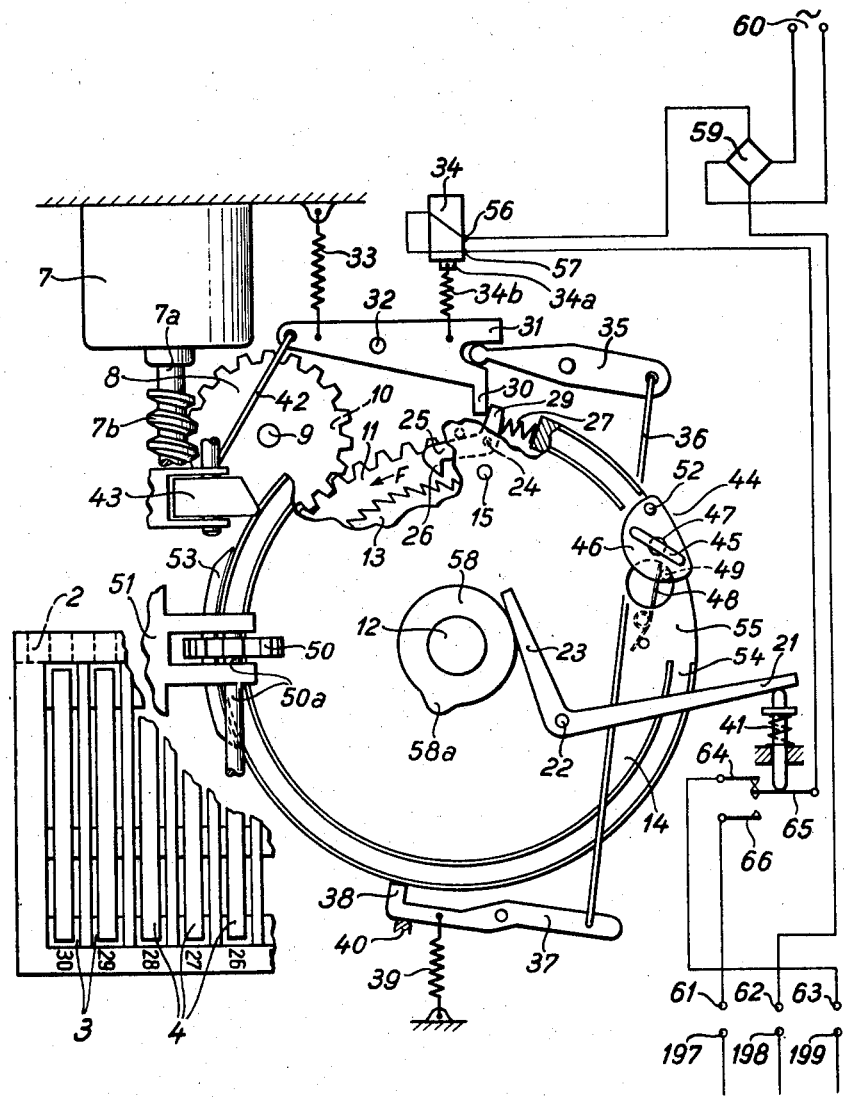
FIGURE 2 is a schematic view of the slide changing mechanism and the mechanism for moving the slide magazine.

After each cycle of the slide changing mechanism, that is moving the slide from the magazine to the projecting position and back to the magazine, the slide magazine is moved a distance of one slide compartment by a slide magazine moving mechanism such as illustrated in FIGURE 2 and which will be described in detail.

Mounted on the casing of the slide projector is a switch 6 for connecting an electric motor 7 to a source of electrical energy. The electric motor 7 comprises a drive shaft 7a upon which is mounted a worm gear 7b which meshes with a worm gear 8 mounted upon a shaft 9 and upon which shaft is mounted another gear 10. The gear 10 meshes with a gear 11 mounted upon a shaft 12. Fixedly connected with the gear 11 is a disk whose periphery is provided with sawtooth shaped gear teeth.

A crank disk 14 is rotatably mounted on the shaft 12 and has a crank pin 15 extending therefrom upon which is pivotally mounted one end of a lever 18. The other end of the lever 18 has a slot 20 therein which slot receives a pin mounted on a lever 17 pivotally mounted at 16. The lever 17 is provided at its free end with a slot 19 which is connected with the slider 5 of the slide changing mechanism. The slot 20 in the lever 18 enables the lever 17 to position the slider 5 in a dead center position in which position the magazine 3 can be moved in either the forward or reverse direction.

A pawl 25 is pivotally mounted on the crank disk 14 upon an axis 24 and is provided with a detent or tab 26 which is engageable with the teeth on the disk 13. A spring 27 urges the pawl 25 into engagement with the teeth on the disk 13. The other end of the pawl 25 is provided with an arm 29 which is engageable by an arm 30 on a locking lever 31 which is pivotally mounted at 32 and also functions as a clutch actuating member. A spring 33 maintains the locking lever 31 in the position as shown in FIGURE 2 with its arm 30 engaging the pawl arm 29.

An electromagnet 34 having an armature 34a is connected with the locking lever 31 by a spring 34b so that the electromagnet 34 can pivot the locking lever 31 against the action of the spring 33.

The locking lever 31 is also pivotable by a pivotally mounted lever 35 one end of which extends into a notch in the locking lever 31. The lever 35 is connected by a rod 36 to a second pivotally mounted locking lever 37 which has a bent end 38 positionable in the path of the pawl arm 29. The locking lever 37 is urged by a spring 39 into engagement with a stop or abutment 40.

The unnotched end of the locking lever 31 is connected by a connecting rod 42 with a pivotally mounted operating lever 43. The operating lever 43 is positioned so as to project into the path of a gear actuating member 44 when the locking lever 31 is pivoted against the action of the spring 33. The gear actuating member 44 comprises a shoulder 45 mounted on a base plate 46 which is pivotally mounted on a shaft 47 positioned on the crank disk 14. A spring 48 urges the gear actuating member 44 against a stop 49.

The shoulder 45 of the gear actuating member 44 is engageable with the gear teeth of a gear or indexing wheel 50 which is rotatably mounted on shaft 50a in a fork 51. The indexing wheel 50 is engageable with the rack gear 2 of the slide magazine 3.

The gear actuating member 44 is additionally provided with an upstanding cam pin 52 which is engageable with either the inner or outer edge of a cam 53 which extends on both sides of the gear wheel 50. The engagement of the cam pin 52 with the cam 53 ensures that the gear actuating member 44 remains in its selected position during its engagement with the gear or indexing wheel 50.

In order to prevent movement of the indexing wheel 50 during all of the positions of the crank disk 14, a grooved track 54 is provided on the crank disk 14. The track 54 is continuous except for a space in the area of the gear actuating member 44 and at a space 55 which corresponds to the position of the crank disk 14 and the slide 5, respectively, for manual manipulation of the slide magazine.

The position of the pawl 25 and the gear actuating member 44 with respect to the crank pin 15 is such that when the pawl 25 is in its locked position because of the locking lever 31, the slide member 5 is in such a position that the slide 4 can be projected. In this position the gear actuating member 44 is so located with respect to the indexing wheel 50 that after the crank disk 14 rotates through half a revolution or 180° during which the slide 5 is returned from its projecting position to its initial position, the gear actuating member 44 engages the indexing wheel 50 in order to move the slide magazine 3.

The electrical circuit for energizing the electromagnet 34 is illustrated in FIGURE 2. The electromagnet has terminals 56 and 57 with the terminal 56 being connected with a rectifier 59 and a contact 62 which is in the form of a socket. The rectifier 59 is connected across a source of electrical energy 60. The other terminal 57 is connected with a moveable spring contact arm 65 moveable between contacts 64 and 66 which are connected to contact sockets 63 and 61, respectively. The moveable contact arm 65 in its normal position engages contact 64 but can be pivoted into engagement with contact 56 by means of a resiliently mounted bolt 41. The bolt 41 is depressed to move the contact arm 65 by a crank lever 21 which is pivotally mounted on a stationary shaft 22 and has a lever arm 23 which is engageable with a cam disk 58 having a cam 58a thereon. The cam disk 58 rotates with the crank disk 14. A manually operable switch may be connected with the contact sockets 61, 62, and 63.

The crank disk 14, to which is connected the slide changing mechanism, can be coupled with the gear disk 13 which rotates in the direction of arrow F by the clutch pawl 25. The clutch pawl 25 can be disengaged from the toothed disk 13 not only by the locking lever 31 but also by the locking lever 37 depending upon the position of the disk.

Figure 3:
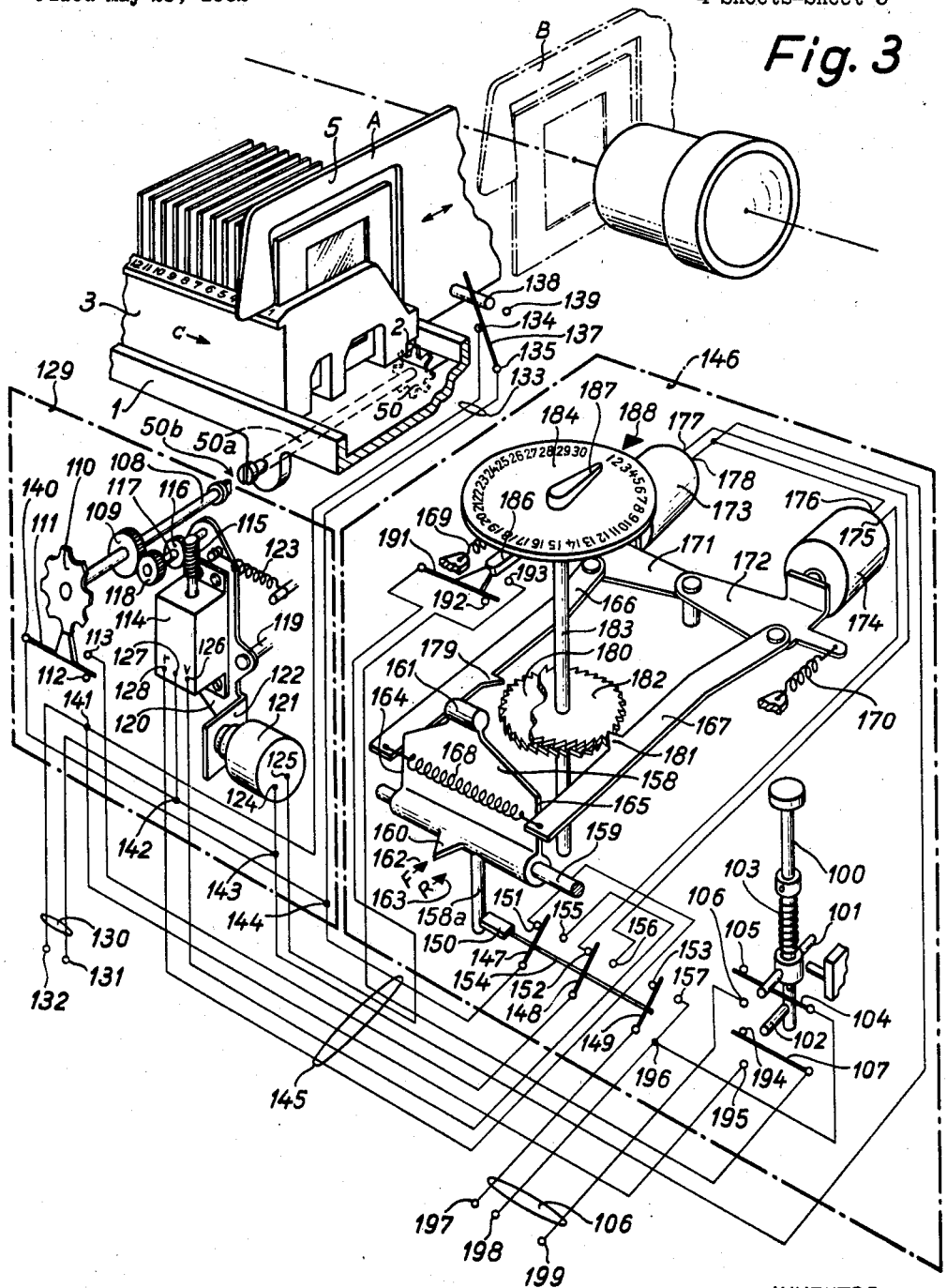
FIGURE 3 is a schematic perspective view of the electric motor for driving the magazine moving means and the slide indicating device together with the various connections therebetween and to the operating lever of the slide projector.
Figure 5:
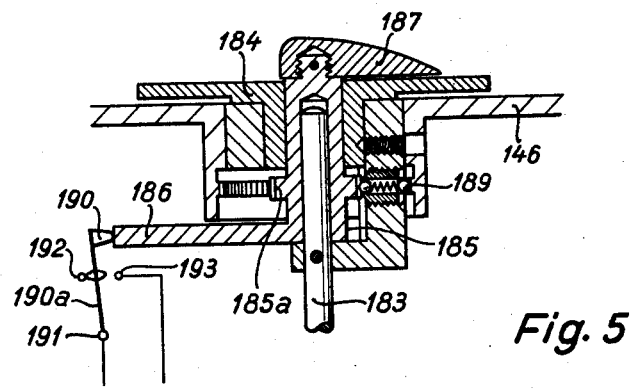
FIGURE 5 is a sectional view taken through the preselector of the slide indicating device.

All of the elements described above are mounted in the casing of the projector. Almost all of these elements are components of the slide changing mechanism and the magazine moving mechanism whose functions will be later described in detail. The structure which is presently to be described and is illustrated in FIGURE 3 is grouped into two assemblies which either can be mounted directly upon the projector or positioned at a distance therefrom and connected to the projector by control cables.

The shaft 50a upon which the indexing wheel 50 is mounted is constructed in a known and conventional manner so that a knurled knob or adjusting wheel can be mounted thereon whereby the indexing wheel 50 can be operated manually to move the slide magazine. This is possible, however, only in a particular position of the slide changing mechanism, namely when the slider 5 is in position A, as illustrated in FIGURE 3. In the present invention, however, the adjusting wheel has been replaced by a shaft 108 which can be connected with the end of shaft 50a by a detachable coupling indicated generally at 50b. As may be seen in FIGURE 3, there are mounted upon the shaft 108 a gear 109 and a cam wheel 110 having a plurality of cams whose number and position correspond to the teeth on the indexing wheel 50.

The cam wheel 110 functions together with a resilient contact arm 111 to produce electrical pulses in the electrical control circuit for the projector. The contact arm 111 normally engages contact 112 but is urged into engagement with contact 113 by the cam surfaces on the cam wheel 110.

Figure 4:
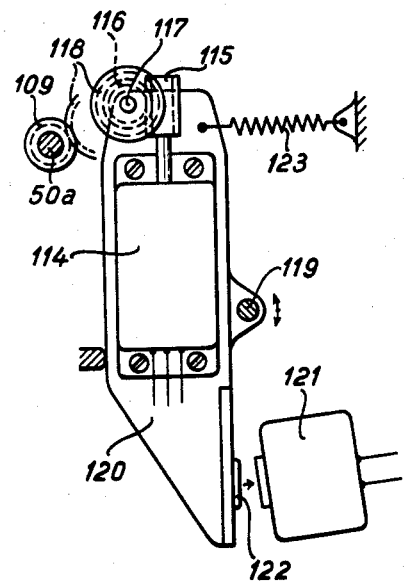
FIGURE 4 is an elevational view of the electric motor which may be engaged or disengaged from the magazine moving mechanism.

Although the indexing wheel 50 can be progressively rotated to move the slide magazine 3 by the mechanism as described above and illustrated in FIGURE 2, an additional driving device is provided which is drivingly engageable with gear 109. This additional driving device comprises a reversible electric motor 114 having a worm 115 on the drive shaft thereof which worm engages a gear 116 mounted on a shaft 117. A gear 118 is also mounted on the shaft 117 and is positioned so as to be engageable with the gear 109 which relationship may be seen in FIGURE 4. The electric motor 114 and its gear system 116, 117 and 118 are mounted on a plate 120 which is pivotally mounted on a shaft 119.

An electromagnet 121 is provided to actuate an armature 122 which is formed as a portion of the supporting plate 120. A spring 123 acts upon the supporting plate 120 to urge the plate in its normal or disengaged position, as may be seen in FIGURE 4, when the electromagnet 121 is not energized. The electromagnet is provided with two terminals 124 and 125.

The electric motor 114, which can be connected for either clockwise or counter-clockwise rotation, has three terminals 126, 127 and 128. A dash-dotted line 129 encloses the elements which have been immediately described to indicate that these elements are contained in a separate assembly which can be connected to the casing of the projector. The electrical energy supply for the electrical components of the assembly 129 is provided through a bifilar cable 130 which leads to connecting terminals 131 and 132 on the projector. In addition, a two-conductor cable 133 connects contacts 134 and 135 of a switch having a moveable contact arm 137 which is actuated by a pin 138 positioned on the slider 5. The slider 5 is moveable between positions A and B and the contact arm 137 abuts a stop 139 when the slider 5 is in its projecting position B. The several cable junctions or connecting points in the assembly 129 are indicated at 140, 141, 142, 143 and 144. A multi-strand cable 145 connects the assembly 129 with a remote control assembly 146 which is similarly enclosed in dash-dotted lines shown in FIGURE 3.

The assembly 146 includes a switch 150 which comprises moveable contact arms 147, 148 and 149 interconnected by a rod 154. In the normal position of the switch 150, when the magazine is being moved in the forward direction, the contact arms engage the contacts 151, 152 and 153 under the action of a spring but are also engageable with contacts 155, 156 and 157.

A manually operable reversing switch comprises a member 158 which is slidably mounted on shaft 159 and has a projection 158a which is engageable with switch 150 to actuate the same. The member 158 is provided with a handle 161 and a pointer 160 which cooperates with two stationary marks 162 and 163 which mark the end positions of the slider 158 and correspond to the forward and reverse movements of the slide magazine.

A pair of pawl levers 166 and 167 is interconnected by a tension spring 168 to be urged into position against lateral edges 164 and 165, respectively, of the sliding member 158. The pawl levers are pivotally connected to pivotally mounted armatures 171 and 172 to which are connected springs 169 and 170. Cooperating with the armatures 171 and 172 are electromagnets 173 and 174 with electromagnet 174 being provided with terminals 175 and 176 and electromagnet 173 having terminals 177 and 178.

The pawl lever 166 is provided with a pawl 179 which is positioned in the plane of a ratchet wheel 180, and a pawl 181 on the pawl lever 167 is positioned in the plane of a ratchet wheel 182. The ratchet wheels 180 and 182 are toothed in opposite directions, as may be seen in FIGURE 3, wherein each ratchet wheel is adapted for movement in only one direction. These ratchet wheels are mounted upon a common shaft 183 on the upper end of which is mounted a numbered disk 184 which moves together with movement of the ratchet wheels. The upper face of the numbered disk 184 is provided with a plurality of numbers adjacent the periphery thereof which numbers correspond to the slide compartments of the slide magazine 3. These numbers may be formed of a luminescent material or may be illuminated in a conventional manner to facilitate the reading thereof.

Rotatably mounted on the shaft 183 on the upper end thereof is a hub 185 having a positioning disk 185a formed integral therewith. The disk 185a has a plurality of detent notches on the outer periphery thereof which detent notches are angularly spaced so as to correspond with the angular spacing of the numerals on the numbered disk 184. On the lower end of the hub 185 there is mounted a radially extending switching element 186 and on the upper end of the hub is mounted a pointer 187 which is registerable with the numbers on the disk 184 and with a zero index mark 185 shown in FIGURE 3. The disk 185a is progressively moved together with the numbered disk 184 and the numbered disk 184 is positioned by a spring-biased detent 189 which engages with the detent slots on the disk 185a.

The switching element 186 engages a cam 190 on a moveable contact arm 190a of a switch 191. The contact arm 190a engages contact 192 when the cam 190 is actuated by the switching element 186 and rests upon a contact 193 in its released position.

Figure 6:
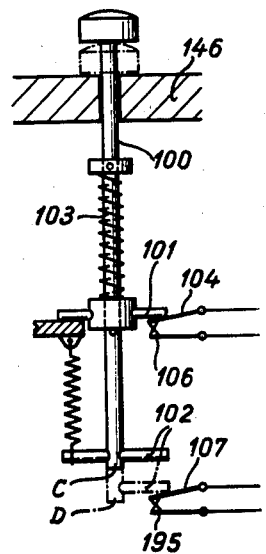
FIGURE 6 is a sectional view of that portion of the projector showing the operating lever and the contacts actuated thereby.

The assembly 146 is also provided with an operating lever or operator rod 100 which has two operating positions C and D as may be seen in FIGURE 6 of the drawings. The lever 100 comprises actuating pins 101 and 102 with pin 101 being slidably mounted on the operator rod and under the action of a spring 103. In position C the actuating pin 101 engages moveable contact arm 104 which is moveable between contacts 105 and 106. In position D, however, the actuating pin 102 also acts to contact moveable contact arm 107 which is moveable between contacts 194 and 195. When the contact arms 104 and 107 are in their normal positions and are not actuated by the actuating pins 101 and 102, these arms rest against the contactors 105 and 194, respectively, due to the resilient construction of these contact arms.

The moveable contact arm 104 is connected to contact 157 at a junction 196. The assembly 146 is provided with jacks or plugs 197, 198 and 199 which correspond in the same sequence to the socket contacts 61, 62 and 63 positioned on the casing of the projector. This relationship is indicated in FIGURE 2 of the drawings.

The several operations possible with the slide projector of the present invention and its assemblies will next be described in detail. For purposes of clarity each of the operations will be described separately.

(1) Operation of the slide changing mechanism and the magazine transportation mechanism through one cycle of the slide changer.

Proceeding from the positioning of the slide changing mechanism in the slide projecting position wherein the slider 5 is in position B as shown in FIGURE 3, the contact arm 137 engages the contact 139. Assuming that it is desired to move the slide magazine 3 in the forward direction, the sliding member 58 must be positioned by operating the handle 161 so that the pointer 160 points to the forward mark 162. In this initial position the crank pin 15 as well as the clutch pawl 25 and the shoulder 45 on the gear actuating member 44 are in the positions illustrated in FIGURE 2. It is also assumed that the motor 7 has already been energized by closing the switch 6 and the gear 11 and the toothed disk 13 are being driven through the worm 7b and the gear 8. The toothed disk 13 moves in the direction of the arrow F, as shown in FIGURE 2.

In order to change the slide which is being projected the operating lever 100 positioned in the assembly 146 must be pushed into position C. In this position the spring contact arm 104 is disengaged from contact 105 and engages contact 106. This closes the circuit for the lifting magnet 34 which is thus energized. The following circuit, which is indicated at circuit I, is then formed: Terminal 56—rectifier 59—socket contact 62—jack 198—junction 196—moveable contact arm 104—stationary contact 106—jack 199—socket contact 63—contact 64—moveable contact arm 65—electromagnet terminal 57.

Energization of the lifting magnet 34 causes the armature 34a to be lifted whereby the locking lever 31 is pivoted about its axis 32 against the action of the spring 33. This pivoting movement of the locking lever 31 also pivots the lever 35 and the locking lever 37 connected thereto by the rod 36. The action of the locking lever 37, however, does not affect the elements necessary for changing the slide.

When the locking lever 31 is pivoted, its arm 30 is disengaged from the clutch pawl 25 which, under the action of the spring 27, rotates about its axis 24 and causes the detent 26 to mesh with the gear teeth on the periphery of the disk 13. The disk 13, which is continuously rotating after the motor 7 is energized, now causes the crank disk 14 to rotate therewith. During one complete rotation of the crank disk 14, the slider 5 is moved from position B to position A and then back to position B under the action of the lever 17. As a result, the slide which is in the projecting position is returned to slide magazine 3.

After the slide magazine has been advanced a distance of one slide compartment in a manner to be presently described, a new slide is gripped by the slider 5 and moved to the projecting position. The stopping of the crank disk 14 upon completion of this slide changing cycle is achieved by locking lever 31 which has returned to its normal position. As a result, the arm 30 is in the path of the pawl arm 29 and contacts the pawl arm to pivot the clutch pawl 25 so as to disengage its detent 26 from the toothed disk 13.

The gear actuating member 44, which is rotatably mounted on the crank disk 14, is moved into the zone of the pivotally mounted operating lever 43 after the crank disk 14 rotates through a predetermined angle. The operating lever 43 is angularly positioned about 120° from the arm 30 of the locking lever 31.

The operating lever 43 which is also actuated when the lifting magnet 34 is energized is returned to its original position before the gear actuating member 44 is pivoted to the operating zone of the operating lever 43. The gear actuating member 44 is then pivoted away from the operating lever 43 in the same initial position which corresponds to the forward movement of the slide magazine. The lifting magnet 34 has been deenergized either by release of the operating lever 100 or by the cam 58a acting upon the resiliently mounted bolt 41 through crank lever 21 to open the contacts 64 and 65.

As the crank disk 14 rotates, the shoulder 45 meshes with the indexing wheel 50 which, being in engagement with the rack gear 2 on the slide magazine, moves the slide magazine a distance equal to the width of one slide compartment. This actuation of the indexing wheel 50 occurs after the crank disk has rotated through an angle of 180°. Before this position of the crank disk 14 is reached, the slider 5 has returned the slide to the slide magazine 3. In the above-mentioned position of the gear actuating member 44, the shoulder 45 is so positioned that the slide magazine is advanced by one switching step or a distance of one slide compartment. To ensure that the gear actuating member 44 retains this position during the switching of the indexing wheel 50, the pin 52 on plate 46 of the gear actuating member 44 slides along the interior edge of the cam 53 and thus prevents any movement of the gear actuating member 44 during engagement with the indexing wheel 50.

In the event it is desired to change slides and to move the slide magazine in the reverse direction, the handle 161 of the reversing switch is moved so that the pointer 160 points to the reverse mark 163. The energization of the lifting magnet 34 in order to change a slide is accomplished in the same manner as when the slide magazine is to be moved in the forward direction. However, the gear actuating member 44 is pivoted to the reverse position by engagement of the shoulder 45 with the operating lever 43. The gear actuating member 44 is then maintained in this position by the pin 52 which slides on the exterior face of the cam guide 53.

The pivoting of the operating lever 43 is obtained since the lifting magnet 34 remains energized even after the operating lever 100 has been released. This is attained by the cam 58a which, in the switching position for shoulder 45, actuates the crank lever arm 23 and thereby the bolt 41 which closes the contact arm 65 with the contact 66. The circuit diagram for the lifting magnet 34 is then as follows. Circuit II; terminal 56—rectifier 59—socket contact 52—jack 198—junction 196—contact 157—moveable contact arm 149—jack 197—socket contact 61—contact 66—moveable contact arm 65—lifting electromagnet terminal 57.

(2) Operation of the slide indicating device during a slide changing operation.

During one revolution of the crank disk 14, the slider 5 performs a movement for changing a slide by moving from position B to position A and then back to position B as may be seen in FIGURE 3. While the slider 5 is in position A, the slide magazine is moved by one step with the direction of movement of the slide magazine being determined by the positioning of the pointer 160 of the reversing switch. In this position the pin 138 on the slider 5 moves the spring contact arm 137 so as to close the contacts 134 and 135 during the movement of the slide magazine.

The cam wheel 110 moves simultaneously with the indexing wheel 50 and, for a short period of time, the spring contact arm 111 is urged into engagement with contact 113. As a result, the electromagnet 174 is energized and attracts thereto the pivoted armature 172, the movement of which is transmitted to the pawl lever 167. In the "forward position" of the reversing switch 161 the pawl 181 engages the ratchet wheel 182 so that the ratchet wheel 182 is rotated by one tooth under the movement of the pawl lever 167. Simultaneously with this movement of the ratchet wheel 182, the numbered disk 184 also moves so that the next-higher number thereon is positioned in front of index 188. As a result, each slide change is automatically indicated by the relationship of the numbered disk and the index 188. The circuit for the electromagnet 174 is as follows. Circuit III: terminal 176—junction 143—junction 142—terminal 131—terminal 132—connection 141—contact 134—moveable contact arm 137—contact 135—junction 144—contact 140—moveable contact arm 111—stationary contact 113—moveable contact arm 148—stationary contact 152—electromagnet terminal 175.

During the movement of the numbered disk 184 the electric motor 114 is also energized but the electromagnet 121 is not energized so that the motor 114 is not in engagement with the gear 109. The electromagnet 121 is not energized because the switching element 186 maintains the moveable contact arm 191 against the stop 192.

In order to move the slide magazine in the reverse direction, the reversing switch 161 must be moved so that the pointer 160 registers with the "reverse position" 163. This sliding movement of the sliding member 158 is also transmitted to the pawl levers 166 and 167 which are maintained in engagement wth the lateral edges 164 and 165 of the sliding member 158 under the action of the spring 168. The pawl lever 167 is pivoted outwardly so that its pawl 181 is disengaged from its ratchet wheel 182. The pawl 179, however, is engaged with the teeth of the ratchet wheel 180 since the pawl lever 166 is pivoted inwardly when the reverse switch 161 is moved to the reverse position.

In addition, when the reversing switch is moved to the reverse position, the contact arms 147, 148 and 149 are reversed by the member 154 to engage the contacts 155, 156 and 157. The reverse movement of the slide magazine is then obtained in the manner as previously described.

When the operating lever 100 is pushed to position C after the reversing switch has been positioned into its reserve position, the above-described operation will be repeated with the exception, however, that the electromagnet 173 will be energized instead of the electromagnet 174. As a result, the armature 171 is attracted to move the pawl lever 166 and the pawl 179 in engagement with the ratchet wheel 180 whereby the numbered disk 184 is rotated clockwise. As a result, the next-lower number is positioned in front of index 188. The flow of current for the energization of electromagnet 173 is set forth in the following circuit. Circuit IV: terminal 178—junction 143—junction 142—terminal 131—terminal 132—junction 141—contact 134—contact arm 137—contact 135—junction 144—contact 140—moveable contact arm 111—contact 113—moveable contact arm 148—contact 156—electromagnet terminal 177.

(3) Slide changing operation wherein a particular slide is preselected.

It is assumed that the parts of the slide projector are in the positions as illustrated in FIGURE 3 with the numbered disk 184 indicating slide No. 2, the pointer 160 of the reversing switch indicating forward movement of the slide magazine, and it is desired to next project the slide contained in compartment No. 5. The pointer 187 is first adjusted so as to point to No. 5 on the numbered disk 184. As a result of this adjustment the switching element 186 will be disengaged from the cam 190 and the moveable contact arm 190a will close contacts 191 and 193. The operating lever 100 is then depressed to position D as may be seen in FIGURE 6. In this position spring contact 104 is moved into engagement with contact 106 under the action of the actuating pin 101, and the contact arm 107 is moved into engagement with contact 195 under the action of actuating pin 102. The closing of contacts 104 and 106 initiates the slide changing operation wherein the slider 5 is in position B and is brought into position A. For this purpose circuit I is connected as described previously.

The slider 5 will remain in position A as long as the operating lever 100 is maintained in the depressed position. This is accomplished since the arm 38 on the locking lever 37 is actuated simultaneously with locking lever 31 to be positioned into the path of the clutch pawl 25. After the crank disk 14 pivots through an angle of 180° it is stopped in this position by the locking lever 37. In this position of the crank disk 14 the shoulder 45 of the gear actuating member 44 has moved the indexing wheel 50 by one switching step. The space 55 of the track 54 is then positioned within the zone of action of the indexing wheel 50 so that the indexing wheel 50 is now free to move. In this position of the switching mechanism the additional magazine moving structure comprising the electric motor 114 is drivingly engaged with the magazine moving mechanism. This engagement is brought about by the energization of the electromagnet 121 which attracts the armature 122 thereto to swivel the supporting plate 120 and to bring the gear 118 into driving engagement with gear 109. The circuit for the electromagnet 121 is as follows. Circuit V: terminal 124—junction 143—junction 142—terminal 131—terminal 132—junction 141—contact 195—moveable contact arm 107—contact 193—moveable contact arm 191—electromagnet terminal 125.

The electric motor 114 is energized to rotate in such a direction that the indexing wheel 50 rotates to move the slide magazine 3 in the forward direction, as indicated by the arrow C in FIGURE 3. However, the rotation of the electric motor 114 commences only when the slider 5 has reached position A and its pin 138 has closed the contacts 134 and 135. The circuit for the energization of electric motor 114 is as follows. Circuit VI: motor terminal 127—junction 142—terminal 131—terminal 132—junction 141—contact 134—moveable contact arm 137—contact 135—junction 144—moveable contact arm 147—contact 151—electric motor terminal 128.

The rotation of electric motor 121 is transmitted to gear 109 which, in turn, rotates the shaft 108 upon which the cam wheel 110 is mounted. Rotation of cam wheel 110 actuates the spring contact arm 111 to energize electromagnet 174 to move the numbered disk 184 in one step in the manner as previously described in connection with the operation of a single slide changing operation. As a result, the circuit to electromagnet 174 is that of circuit III.

This circuit is then briefly opened by the action of the cams on the cam wheel 110 against the spring contact arm 111. After this opening of the circuit, the electromagnet 174 is again energized and the numbered disk 184 rotated another interval. This operation is repeated until the switching element 186 contacts the cam 190 so as to open contact arm 190a from contact 193. This deenergizes electromagnet 121 and, under the action of spring 123, the support plate 120 is returned to its disengaged position and the driving connection between motor 114 and the shaft 50a is interrupted.

During this switching operation the operating lever or key 100 must be maintained in its depressed position. The movement of the slide magazine may be stopped when the desired slide compartment numbered is read from the numbered disk 184 or can be indicated by a signalling arrangement acting as a function of the position of the moveable contact arm 190a.

As soon as the slide magazine has reached its desired position, the operating lever 100 can be released. This deenergizes lifting magnet 34 and the locking lever 37 is returned to its normal position as shown in FIGURE 2 under the action of spring 39. The arm 38 is then disengaged from the clutch pawl arm 29 and the clutch pawl 25 again engages with the toothed disk 13 and continues the movement of the crank disk 14. The movement of the crank disk 14 is then stopped by the arm 30 of locking lever 31 which has been returned into its position as shown in FIGURE 2 wherein the arm 30 is interposed in the path of the clutch pawl arm 39.

In this last phase of the slide changing operation wherein the crank disk 14 moves through the second half of a revolution, a new slide is brought into the projecting position B.

The operation for projecting a preselected slide wherein it is necessary for the slide magazine to be moved in the reverse direction is substantially similar to that as described above. In order to move the slide magazine in the reverse direction it is only necessary to actuate reversing switch 161 so that the pointer 160 registers with reverse mark 163. Circuits II, IV and V are then connected as well as the following circuit for the motor 114. Circuit VII: electric motor terminal 127—junction 142—terminal 131—terminal 132—junction 141—contact 134—moveable contact arm 137—contact 135—junction 144— moveable contact arm 147—stationary contact 155—electric motor terminal 126.

Thus it can be seen that the slide projector of the present invention enables the operator to preselect any slide which he desires to be projected. The position of this slide is immaterial since the slide magazine can be readily moved in either the forward or reverse directions in order to present the proper slide compartment in position for the slider 5 to grip the slide desired to be projected. In addition, the slide projector includes a slide indicating device which indicates at all times the precise position of the slide magazine in the slide projector and the slide which is in position to be projected. The structure to carry out these operations may be built into separate units which may then either be mounted directly upon the slide projection or may be separate therefrom but connected to the projector for operation by control cables. Thus, the device for indicating the position of the slide magazine may be positioned adjacent to the operator while the slide projector may be located remote from the operator.

It will be understood that this invention is susceptible to modification in order to adapt it to different usages and conditions and, accordingly, it is desired to comprehend such modifications within this invention as may fall within the scope of the appended claims.

What is claimed as this invention is:

1. In a slide projector, an automatic slide changing mechanism, means for transporting a slide magazine in said projector in forward and reverse directions, means operatively connected to said transporting means for indicating the position of a slide magazine in said projector and including a selectively positionable preselector switch, power means drivingly engageable with said transporting means, an operator rod, and means actuated by said operator rod and responsive to the position of said preselector switch for drivingly engaging said power means to said transporting means to move a slide magazine into position to project a slide corresponding to the position of said preselector switch.

2. In a slide projector, an automatic slide changing mechanism, means for transporting a slide magazine in said projector in forward and reverse directions, means including power means and a selectively positionable preselector switch for indicating the position of a slide magazine in said projector, transmission means for drivingly engaging said power means to said indicating means and said transporting means, an operator rod, and means actuated by said operator rod and responsive to the position of said preselector switch for engaging said transmission means between said power means and said transporting means to move a slide magazine into position to project a slide corresponding to the position of said preselector switch.

3. In a slide projector, an automatic slide changing mechanism, means for transporting a slide magazine in said projector in forward and reverse directions, means operatively connected to said transporting means for indicating the position of a slide magazine in said projector and including a selectively positionable preselector switch, power means drivingly engageable with said transporting means, an operator rod, means actuated by said operator rod and responsive to the position of said preselector switch for drivingly engaging said power means to said transporting means to move a slide magazine into position to project a slide corresponding to the position of said preselector switch, and means driven by said magazine transporting means for actuating said position indicating means in response to the movement of the magazine so that said indicating means will indicate the position of the magazine in the projector.

4. In a slide projector, an automatic slide changing mechanism, means for transporting a slide magazine in said projector in forward and reverse directions, means driven by electromagnetic means for indicating the position of a slide magazine in said projector and including a selectively positionable preselector switch, power means drivingly engageable with said transporting means, an operator rod, means actuated by said operator rod and responsive to the position of said preselector switch for drivingly engaging said power means to said transporting means to move a slide magazine into position to project a slide corresponding to the position of said preselector switch, and means driven by said magazine transporting means for energizing said electromagnetic means corresponding to the movement of a magazine so that said indicating means will indicate the position of the magazine in the projector.

5. In a slide projector, an automatic slide changing mechanism, means for transporting a slide magazine in said projector in forward and reverse directions, means driven by electromagnetic means for indicating the position of a slide magazine in said projector and including a selectively positionable preselector switch, a switch connected to said magazine transporting means and operable to select the direction of movement thereof and also connected to said electromagnetic means to energize the same to drive the indicating means in a direction corresponding to the direction of movement of the magazine, power means drivingly engageable with said transporting means, an operator rod, and means actuated by said operator rod and responsive to the position of said preselector switch for drivingly engaging said power means to said transporting means to move a slide magazine into position to project a slide corresponding to the position of said preselector switch.

6. A slide projector comprising an automatic slide changing mechanism, means for transporting a slide magazine in said projector in forward and reverse directions, a disk having numbers thereon corresponding to the slide compartments of a slide magazine, a selectively positionable preselector switch registerable with said numbered disk, a pair of ratchet wheels having oppositely disposed teeth thereon so that each wheel is rotatable in only one direction and operatively connected to said numbered disk, a pair of pawls drivingly engageable with said ratchet wheels, respectively, a reversing switch operable to select the direction of movement of said magazine transporting means and operatively connected to said pawls so that shifting the switch brings a corresponding pawl in driving engagement with its respective ratchet wheel, electromagnetic means operatively connected to said pawls for actuating the same to rotate the corresponding ratchet wheel in the direction corresponding to the direction of movement of the slide magazine, and means responsive to the position of said preselector switch for driving said magazine transporting means to move a slide magazine into a position corresponding to the position of said preselector switch.

7. A slide projector comprising an automatic slide changing mechanism, means for transporting a slide magazine in said projector in forward and reverse directions, an electrical control circuit connected to said magazine transporting means and including a reversing switch operable to select the direction of movement thereof, means driven by said magazine transporting means for producing electrical pulses in said control system corresponding to the movement of the slide magazine, a disk having numbers thereon corresponding to the slide compartments of a slide magazine, a selectively positionable preselector switch registerable with said numbered disk, a pair of ratchet wheels having oppositely disposed teeth thereon so that each wheel is rotatable in only one direction and operatively connected to said numered disk, a pair of pawls drivingly engageable with said ratchet wheels, respectively, a pair of electromagnets in said control circuit and operatively connected to said pawls, respectively, and means in said control circuit for connecting one of said electromagnets at a time to said pulse producing means in response to the position of said reversing switch so that shifting of the reversing switch brings a corresponding pawl in driving engagement with its respective ratchet wheel.

8. A slide projector comprising an automatic slide changing mechanism, means for transporting a slide magazine in said projector in forward and reverse directions, an electrical control circuit connected to said magazine transporting means and including a reversing switch operable to select the direction of movement thereof, means driven by said magazine transporting means for producing electrical pulses in said control system corresponding to the movement of the slide magazine, a disk having numbers thereon corresponding to the slide compartments of a slide magazine, a selectively positionable preselector switch registerable with said numbered disk, a pair of ratchet wheels having oppositely disposed teeth thereon so that each wheel is rotatable in only one direction and operatively connected to said numbered disk, a pair of pawls drivingly engageable with said ratchet wheels, respectively, an electromagnet in said control circuit and operatively connected to said pawls, and means in said control circuit for connecting said electromagnet to said pulse producing means so that the pawl corresponding to the position of the reversing switch is drivingly engaged with its respective ratchet wheel to rotate the same in the direction corresponding to the movement of the magazine transporting means.

9. A slide projector comprising an automatic slide changing mechanism, means for transporting a slide magazine in said projector in forward and reverse directions, an electrical control circuit connected to said magazine transporting means and including a reversing switch operable to select the direction of movement thereof, a cam wheel driven in synchronism with said magazine transporting means, a normally open switch closed by said cam to produce an electric pulse in said control circuit upon each closure thereof, a disk having numbers thereon corresponding to the slide compartments of a slide compartments of a slide magazine, a selectively positionable preselector switch registerable with said numbered disk, a pair of ratchet wheels having oppositely disposed teeth thereon so that each wheel is rotatable in only one direction and operatively connected to said numbered disk, a pair of pawls drivingly engageable with said ratchet wheels, respectively, a pair of electromagnets in said control circuit and operatively connected to said pawls, respectively, and means in said control circuit for connecting one of said electromagnets at a time to said pulse producing means in response to the position of said reversing switch so that shifting of the reversing switch brings a corresponding pawl in driving engagement with its respective ratchet wheel.

10. A slide projector comprising an automatic slide changing mechanism, means including a gear engageable with a rack gear on a slide magazine for transporting the slide magazine in forward and reverse directions, an electric control circuit connected to said magazine transporting means and including a reversing switch operable to select the direction of movement thereof, a cam wheel having a number of cams thereon corresponding to the number of teeth of said transporting means gear and driven in synchronism with said magazine transporting means, a normally open switch closed by said cams to produce an electric pulse upon each closure thereof, a disk having numbers thereon corresponding to the slide compartments of a slide magazine, a selectively positionable preselector switch registerable with said numbered disk, a pair of ratchet wheels having oppositely disposed teeth thereon so that each wheel is rotatable in only one direction and operatively connected to said numbered disk, a pair of pawls drivingly engageable with said ratchet wheels, respectively, a pair of electromagnets in said control circuit and operatively connected to said pawls, respectively, and means in said control circuit for connecting one of said electromagnets at a time to said pulse producing means in response to the position of said reversing switch so that shifting of the reversing switch brings a corresponding pawl in driving engagement with its respective ratchet wheel.

11. A slide projector comprising an automatic slide changing mechanism, means including a gear engageable with a rack gear on a slide magazine for transporting the slide magazine in forward and reverse directions, means operatively connected to said magazine transporting means for indicating the position of a slide magazine in said projector and including a selectively positionable preselector switch, an electric motor drivingly engageable with said transporting means gear, electromagnetic means connected to said electric motor for engaging and disengaging said electric motor with said transporting means, and means responsive to the position of said preselector switch for drivingly connecting said electric motor to said transporting means to move a slide magazine into position to project a slide corresponding to the position of said preselector switch.

12. A slide projector comprising an automatic slide changing mechanism, means for transporting a slide magazine in said projector in forward and reverse directions, a disk having numbers thereon corresponding to the slide compartments of a slide magazine, a selectively positionable preselector switch registerable with said numbered disk, a pair of ratchet wheels having oppositely disposed teeth thereon so that each wheel is rotatable in only one direction and operatively connected to said numbered disk, said numbered disk and said pair of ratchet wheels being mounted coaxially with respect to each other, a pair of pawls drivingly engageable with said ratchet wheels, respectively, a reversing switch operable to select the direction of movement of said magazine transporting means and operatively connected to said pawls so that shifting the switch brings a corresponding pawl in driving engagement with its respective ratchet wheel, electromagnetic means operatively connected to said pawls for actuating the same to rotate the corresponding ratchet wheel in the direction corresponding to the direction of movement of the slide magazine, and means responsive to the position of said preselector switch for driving said magazine transporting means to move a slide magazine into a position corresponding to the position of said preselector switch.

13. A slide projector as claimed in claim 12 and further comprising means for illuminating the numbers on said numbered disk to facilitate the reading thereof.

14. A slide projector as claimed in claim 12 wherein said numbers on said numbered disk are formed from a luminescent material.

15. A slide projector comprising an automatic slide changing mechanism, means for transporting a slide magazine in said projector in forward and reverse directions, a disk having numbers thereon corresponding to the slide compartments of a slide magazine, a stationary index cooperating with the numbers on said disk to indicate the position of a slide magazine in the projector, a selectively positionable preselector switch registerable with said numbered disk, a pair of ratchet wheels having oppositely disposed teeth thereon so that each wheel is rotatable in only one direction and operatively connected to said numbered disk, a pair of pawls drivingly engageable with said ratchet wheels, respectively, a reversing switch operable to select the direction of movement of said magazine transporting means and operatively connected to said pawls so that shifting the switch brings a corresponding pawl in driving engagement with its respective ratchet wheel, electromagnetic means operatively connected to said pawls for actuating the same to rotate the corresponding ratchet wheel in the direction corresponding to the direction of movement of the slide magazine, and means responsive to the position of said preselector switch for driving said magazine transporting means to move a slide magazine into a position corresponding to the position of said preselector switch.

16. A slide projector comprising an automatic slide changing mechanism, means for transporting a slide magazine in said projector in forward and reverse directions, a disk having numbers thereon corresponding to the slide compartments of a slide magazine, a selectively positionable preselector switch registerable with said numbered disk, a pair of ratchet wheels having oppositely disposed teeth thereon so that each wheel is rotatable in only one direction and operatively connected to said numbered disk, said numbered disk and said pair of ratchet wheels being mounted upon a common shaft, said preselector switch comprising a switching element frictionally positioned upon said common shaft and rotatably positionable with respect thereto, a switch actuated by said switching element, a pair of pawls drivingly engageable with said ratchet wheels, respectively, a reversing switch operable to select the direction of movement of said magazine transporting means and operatively connected to said pawls so that shifting the switch brings a corresponding pawl in driving engagement with its respective ratchet wheel, electromagnetic means operatively connected to said pawls for actuating the same to rotate the corresponding ratchet wheel in the direction corresponding to the direction of movement of the slide magazine, and means responsive to the position of said preselector switch for driving said magazine transporting means to move a slide magazine into a position corresponding to the position of said preselector switch.

17. A slide projector as claimed in claim 16 and further comprising a locking arrangement for lockingly engaging said switching element and said common shaft.

18. A slide projector as claimed in claim 16 wherein said switching element comprises a pointer mounted thereon and cooperating with the numerals on said numbered disk.

19. A slide projector as claimed in claim 18 wherein said switching element is so positioned that the switch actuated thereby is opened when said pointer points to said stationary index.

20. A slide projector comprising an automatic slide changing mechanism, means for transporting a slide magazine in said projector in forward and reverse directions, an electrical control circuit connected to said magazine transporting means and including a reversing switch operable to select the direction of movement thereof, a disk having numbers thereon corresponding to the slide compartments of a slide magazine, a pair of ratchet wheels having oppositely disposed teeth thereon so that each wheel is rotated in only one direction, said numbered disk and said pair of ratchet wheels being mounted on a common shaft, a selectively positionable preselector switch having a pointer registerable with said numbered disk and a switch element frictionally positioned on said common shaft for rotation therewith but adjustable to other positions, there being a stationary index adjacent said numbered disk for cooperation with said pointer, a pair of pawls drivingly engageable with said ratchet wheels, respectively, a pair of electromagnets in said control circuit and operatively connected to said pawls, respectively, means in said control circuit for connecting one of said electromagnets at a time to a source of electrical energy in response to said reversing switch, and a switch actuable by said switching element and in circuit with said electromagnets, the position of said switching element being such that said switch is opened when the pointer points to the stationary index so that said electromagnets are deenergized to stop said magazine transporting means.

21. A slide projector as claimed in claim 20 and further comprising additional switch contacts in circuit with said electromagnets, and a manually operable operator rod for actuating said switch contacts.

22. A slide projector as claimed in claim 21 with said switch contacts being connected in circuit with said automatic slide changing mechanism and said magazine transporting means so that both said mechanism and said transporting means can be actuated by said operator rod.

23. A slide projector as claimed in claim 22 wherein said operator rod has two operating positions wherein in one position only the slide changing mechanism and the transporting means can be energized and in the other position the slide changing mechanism, the magazine transporting means and said electromagnets can be energized.

24. A slide projector as claimed in claim 23 and further comprising means for retaining said slide changing mechanism in position during the transporting of a slide magazine in said projector, and means operatively connected to said retaining means for releasing said operator rod into its second operating position when said slide changing mechanism has been retained in the magazine transporting position.

25. In a slide projector, an automatic slide changing mechanism, means for transporting a slide magazine in said projector in forward and reverse directions, means driven by electromagnetic means for indicating the position of a slide magazine in said projector and including a selectively positionable preselector switch, a switch connected to said magazine transporting means and operable to select the direction of movement thereof and also connected to said electromagnetic means to energize the same to drive the indicating means in a direction corresponding to the direction of movement of the magazine, power means drivingly engageable with said transporting means, an operator rod, means actuated by said operator rod and responsive to the position of said preselector switch for drivingly engaging said power means to said transporting means to move a slide magazine into position to project a slide corresponding to the position of said preselector switch, a casing enclosing said operator rod, said indicating means and said direction switch, and a remote control cable for detachably connecting said casing to the slide projector.

26. A slide projector comprising an automatic slide changing mechanism, means for transporting a slide magazine in said projector in forward and reverse directions, a reversible electric motor drivingly engageable with said magazine transporting means, an electric control circuit connected to said magazine transporting means and including a reversing switch operable to select the direction of movement thereof, means driven by said magazine transporting means for producing an electrical pulse in said control circuit corresponding to the movement of the slide magazine, means operatively connected to said magazine transporting means for indicating the position of a slide magazine in said projector and including a selectively positionable preselector switch, an operator rod, means actuated by said operator rod and responsive to the position of said preselector switch for drivingly engaging said electric motor to said transporting means to move a slide magazine into position to project a slide corresponding to the position of said preselector switch, a casing enclosing said impulse producing means and said electric motor and connectable to said projector, and a detachable coupling between said impulse producing means and said magazine transporting means.

27. A slide projector as claimed in claim 26 wherein said detachable coupling comprises a manually operable adjusting knob so that said magazine transporting means can be adjusted manually.

References Cited in the file of this patent

UNITED STATES PATENTS

| 2,732,758 | Waller | Jan. 31, 1956 |
| 2,968,993 | Briskin et al. | Jan. 24, 1961 |

FOREIGN PATENTS

| 838,683 | Great Britain | June 22, 1960 |